United States Patent
Kim et al.

(10) Patent No.: US 7,318,193 B2
(45) Date of Patent: Jan. 8, 2008

(54) METHOD AND APPARATUS FOR AUTOMATIC DOCUMENT GENERATION BASED ON ANNOTATION

(75) Inventors: Jae Hong Kim, Daejeon (KR); Min Su Jang, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 797 days.

(21) Appl. No.: 10/640,386

(22) Filed: Aug. 14, 2003

(65) Prior Publication Data

US 2004/0122912 A1 Jun. 24, 2004

(30) Foreign Application Priority Data

Dec. 21, 2002 (KR) ............. 10-2002-0082194

(51) Int. Cl.
 *G06F 15/00* (2006.01)
(52) U.S. Cl. ............ 715/512; 715/500.1; 709/217
(58) Field of Classification Search ............ 715/512, 715/500.1; 709/217
 See application file for complete search history.

(56) References Cited

U.S. PATENT DOCUMENTS

| | | | | |
|---|---|---|---|---|
| 5,826,025 A | * | 10/1998 | Gramlich | ............ 709/217 |
| 6,081,829 A | * | 6/2000 | Sidana | ............ 709/203 |
| 6,859,909 B1 | * | 2/2005 | Lerner et al. | ............ 715/512 |
| 2002/0129057 A1 | * | 9/2002 | Spielberg | ............ 707/512 |
| 2002/0186241 A1 | * | 12/2002 | Kohda et al. | ............ 345/744 |
| 2006/0186241 A1 | * | 8/2006 | Cole | ............ 242/160.4 |

FOREIGN PATENT DOCUMENTS

| | | |
|---|---|---|
| KR | 2000-37200 | 7/2000 |
| KR | 2001-44282 | 6/2001 |

* cited by examiner

*Primary Examiner*—Stephen Hong
*Assistant Examiner*—David Faber
(74) *Attorney, Agent, or Firm*—Lowe Hauptman Ham & Berner LLP

(57) ABSTRACT

An annotation based automatic web document generation apparatus includes a web server, an annotation editor, an annotation server, an annotation/meta file database, and annotation processing system. The web server provides a web document. The annotation editor refers the web document from the web server to generate at least one annotation and generates a merged command for data for said at least one annotation. The annotation/meta file database stores the data for said at least one annotation and a merged meta file including the merged command for the data for said at least one annotation. Thus, it is possible to generate a new web document adapted for a user terminal by combining context information with the merged meta file and efficiently provide a plurality of user terminals of various characteristics with existing web documents.

11 Claims, 7 Drawing Sheets

METHOD AND APPARATUS FOR AUTOMATIC DOCUMENT GENERATION BASED ON ANNOTATION

FIELD OF THE INVENTION

The present invention relates to a method and apparatus for automatically generating web documents with annotations; and, more particularly, to a method and apparatus for associating web documents with annotations based on equipment context information to automatically generate new web documents adapted to the characteristics of user terminals.

BACKGROUND OF THE INVENTION

Recently, the quantity and kinds of information made into web contents have been exponentially increasing as numerous people come to use the global telecommunication network, such as Internet, in their daily life. On actual service, these various web contents are displayed on display units of user terminals.

Meanwhile, one user commonly has a plurality of terminals, e.g., PC's, cellular phones, PDA's. It is natural that a user should want to have the web contents displayed on his/her own terminals.

Typically, however, the web contents are initially made by authors in consideration of the characteristics of user terminals to which they should be serviced. Namely, in order to service one web content for multiple user terminals, it is necessary to remake the web content into a plurality versions based on the types of user terminals and markup languages, for example, HTML, WML, and etc. Unfortunately, it is practically impossible to remake the web contents adapted for all the types of user terminals since enormous new types of user terminals are being developed.

There are several existing schemes for providing web contents and annotating web documents. One exemplary contents providing scheme, whose object is to retrieve and utilize desired contents from a plurality of books, classifies a plurality of books according to their editions, classifies the contents of each book into a plurality of paragraphs, converts the contents into a user-accessible format to generate new book data, and services the new book data to users based on keywords input by the users.

The above contents providing scheme provides a user with specific portions of existing books based on keywords input by the users. However, the content itself is not regenerated as new forms serviceable to multiple user terminals. In particular, annotations are merely used to indicate user's notes or comments to the contents.

One conventional web documents annotating scheme is to annotate and store a HTML document based on a virtual layer, which can be implemented as a plug-in software or JAVA application program. This scheme establishes a virtual transparent layer for a HTML document, in order for a user to write or draw lines or comments thereon. The annotation written or drawn by the user is converted into a picture format, e.g., GIF file, inserted into the HTML document and stored together with the HTML document.

The annotation of the above scheme is nothing but reference information to a web document located at a specific URL. Further, the annotation has its own limit of not being able to change the contents of the HTML document since it can only be handled as an image file.

U.S. Pat. No. 5,826,025, entitled "SYSTEM FOR ANNOTATION OVERLAY PROXY CONFIGURED TO RETRIEVE ASSOCIATED OVERLAYS ASSOCIATED WITH A DOCUMENT REQUEST FROM ANNOTATION DIRECTORY CREATED FROM LIST OF OVERLAY GROUPS", which is incorporated herein by reference in its entirely, relates to a system for merging annotations from various sources with web documents. The object of this system is to modify (Insert, Delete, Replace, and Run_Program) web documents. A web document is modified; an annotation document is made; the annotation document is merged with the web document; and the merged document is provided to a user.

In the prior arts, the role of annotation information is merely to provide user notes or comments to existing web documents while not considering equipment context information, such as capability of user terminals and display performance of a web browser. Thus, there exists a need for a method and apparatus for automatically generating new contents adapted for various types of user terminals.

SUMMARY OF THE INVENTION

It is, therefore, an object of the present invention to provide annotation based automatic document generation method and apparatus which enable an author, a contents provider, and a user to annotate a web document based on equipment context information associated with display capability of a web browser on a user terminal, and provide the user with a newly generated web document adapted for the type of the user terminal by merging merged meta file and the equipment context information, wherein the merged meta file is generated by merging annotations made to the web document.

In accordance with one aspect of the present invention, there is provided an annotation based automatic web document generation apparatus comprising:

a web server for providing a web document;

an annotation editor for referring the web document from the web server to generate at least one annotation and for generating a merged command for data for said at least one annotation; and an annotation/meta file database for storing the data for said at least one annotation and a merged meta file including the merged command for the data for said at least one annotation.

In accordance with another aspect of the present invention, there is provided an annotation based automatic web document generation method for used in an annotation based automatic web document generation apparatus comprising a web server for providing the web document and an annotation/meta file database for storing the annotations corresponding to the web document, the method comprising the steps of: referring the web document from the web server to generate at least one annotation for the web document and generating a merged command for data for said at least on annotation; and storing the data for said at least on annotation and a merged meta file including the merged command for the data for said at least one annotation.

Therefore, according to the present invention, each of the annotators can make his/her own annotation the web document based on the context information relating to the display capability of the web browser of the user terminal, and generate a new web document adapted for the user terminal by combining the context information with the merged meta file generated from the annotations, to efficiently provide a plurality of user terminals of various characteristics with existing web documents adapted for each of the user terminals.

BRIEF DESCRIPTION OF THE DRAWINGS

The above and other objects and features of the invention will become apparent from the following description given in conjunction with the accompanying drawings, in which.

DETAILED DESCRIPTION OF THE PREFERRED EMBODIMENTS

Figure 1:
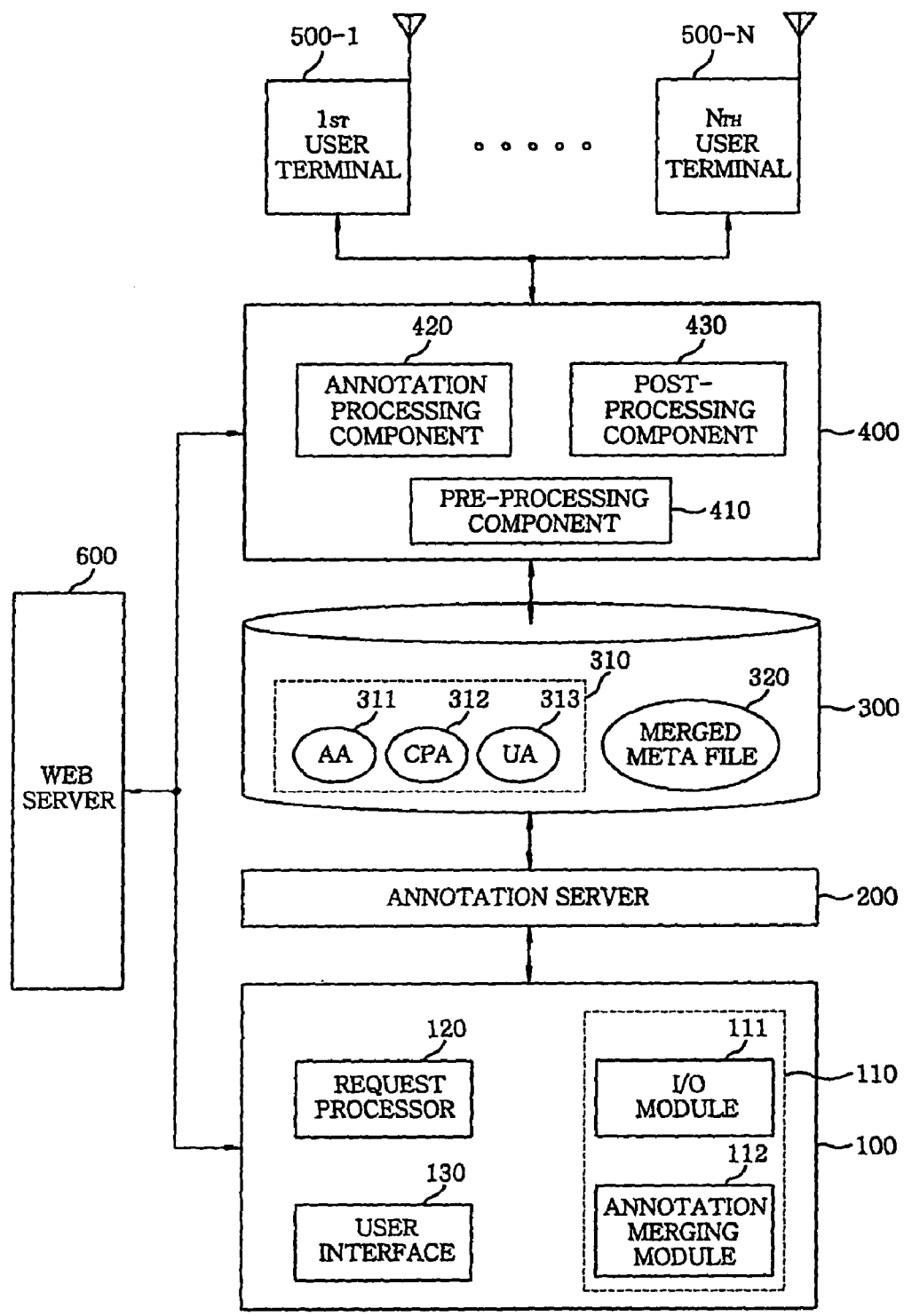
FIG. 1 is a block diagram of an annotation based document generation apparatus in accordance with the present invention.

Referring to FIG. 1, there is shown a block diagram of an annotation based document generation apparatus in accordance with the present invention, which comprises an annotation editor 100, an annotation server 200, an annotation file database(DB) 300, an annotation processing system 400, n user terminals 500-1 to 500-n, wherein n is a positive integer larger than 2, and a web server 600.

The annotation editor 100 comprises an annotation processor 110 including an I/O module 111 and an annotation merging module 112, a request processor 120, and a user interface 130. With the annotation editor 100, annotators i.e., an author, a contents provider, and users, put an annotation on a web document.

More specifically, once an annotator inputs a URL at which his/her desired web document is located, the user interface 130 supplies the URL to the request processor 120. Then, the request processor 120 sends a request for the URL to the web server 600 and, in turn, the web server 600 provides the request processor 120 with the requested web document. Thereafter, the requested web document is sent from the request processor 120 through the user interface 130 to a display unit of the annotator for display thereof.

By using the user interface 130, the annotator makes an annotation to the web document displayed on his/her display unit according to a scheme supported by the annotation editor 100, wherein the structure and contents of one annotation is dependent on the annotator and the possible scheme is the so-called WYSIWYG scheme in accordance with a preferred embodiment of the present invention. The annotation data, together with a merged meta file generated by the annotation merging module 112, is supplied to the annotation server 200 via the I/O module 111. The procedure for generating the merged meta file in the annotation merging module 112 will be described in detail with reference to FIG. 2.

The annotation merging module 112 prevents three(3) annotations, which can be appended to one web document by its author, its contents provider, and one of its users, from conflicting with each other by arbitrating between different instructions included in the annotations. Assuming a case that an author, a content provider, and a user make different annotations to a web document, the annotations include instructions to do different actions for the web document, and the actions conflict with each other.

Figure 2:
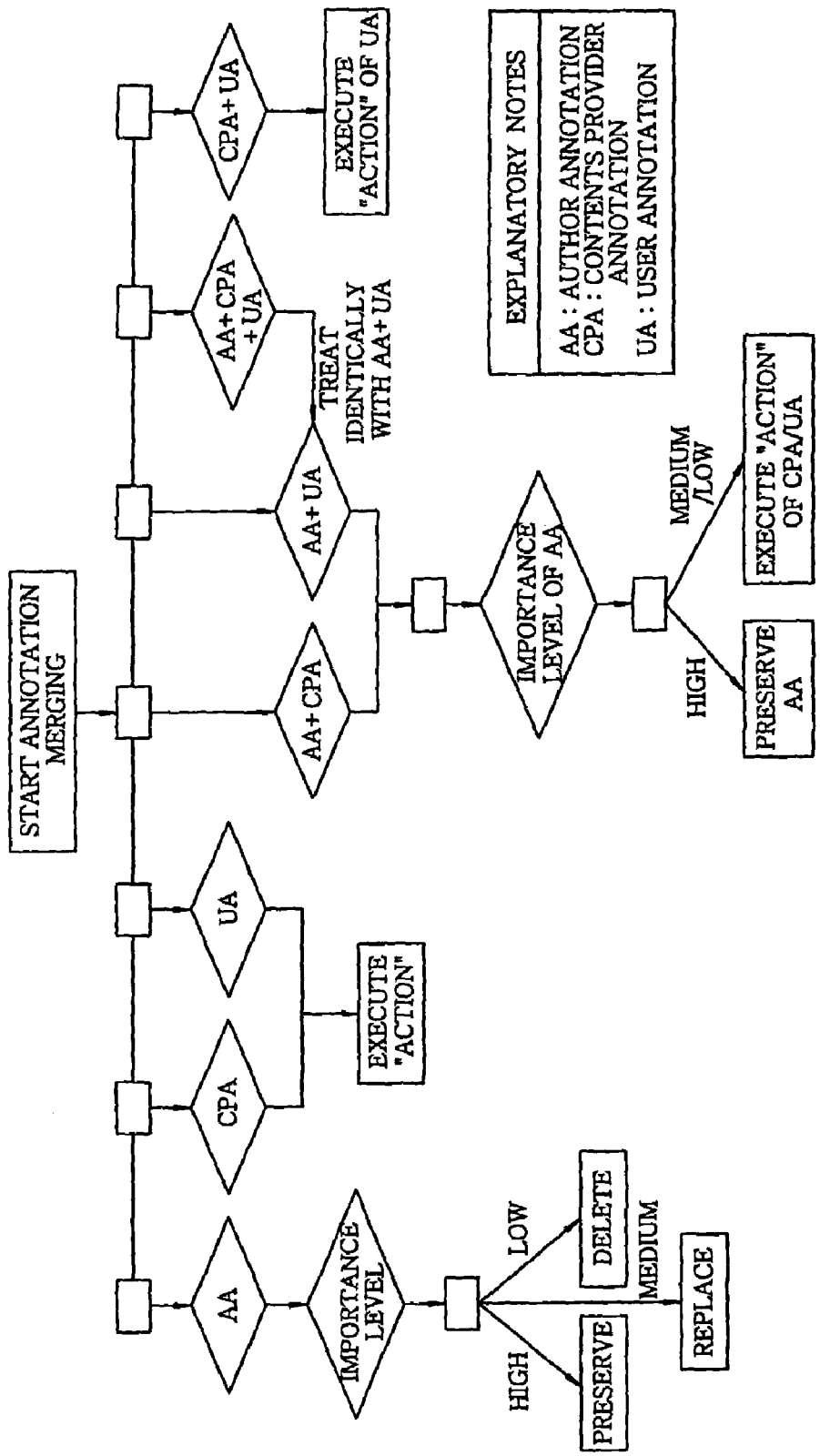
FIG. 2 depicts a flow chart for an annotation merging module to process annotations in accordance with the present invention.

Referring to FIG. 2, a flow chart describing a procedure for arbitrating between conflict annotations is shown. The detailed description of the procedure is illustrated in Table 1. In Table 1, there are seven(7) possible cases which can occur during annotating a web document. The case when there is no annotation to the web document is not included in FIG. 2 and Table 1. In such case, an original web document with no annotation is transmitted to a user. Hereinafter, AA means an author's annotation, CPA indicates a contents provider's annotation, and UA refers to a user's annotation.

TABLE 1

| Cases | Arbitration | | |
|---|---|---|---|
| 1. when there exists AA alone | importance level of AA | high | generate a "preserve contents" command in the merged meta file |
| | | medium | generate a "replace contents" command in the merged meta file |
| | | low | generate no command in the merged meta file (automatically delete contents) |
| 2. when there exists CPA alone | generate the same command as that of CPA in the merged meta file | | |
| 3. when there exists UA alone | generate the same command as that of UA in the merged meta file | | |
| 4. when there exist AA and CPA | when the importance level of AA is high | | generate a "preserve contents" command in the merged meta file |
| | Otherwise | | generate the same command as that of CPA in the merged meta file |
| 5. when there exist AA and UA | when the importance level of AA is high | | generate a "preserve contents" command in the merged meta file |
| | Otherwise | | generate the same command as that of UA in the merged meta file |
| 6. when there exist AA, CPA and UA | the same as case 5 | | |
| 7. when there exist CPA and UA | the same as case 3 | | |

As illustrated above, the annotations are merged, i.e., the conflicting actions between the annotations are arbitrated to generate a merged command in the merged meta file 320. An example of the structure of the merged meta file 320 comprising a plurality of merged commands 3590 is offered in FIG. 3.

The merged command 3590 includes a destination node address 3591 and a plurality of commands 3592 and 3596. The command 3592 consists of context information 3593, action 3594, and alternative resource 3595.

In case that the merged meta file is generated by merging CPA and UA, there occurs no problem since the structure of UA is the same as that of CPA. However, when AA exists, it is necessary to make conversion between two different structures of annotations. The detailed explanation on the conversion is set forth in Table 2.

TABLE 2

| AA command | | conversion |
|---|---|---|
| importance level | high | 1. destination node address of AA command -> destination node address of the merged command<br>2. context of AA command -> context of the merged command<br>3. add an action of "preserve current contents" in the merged command |
| | medium | 1. destination node address of AA -> destination node address of the merged command<br>2. context of AA -> context of the merged command<br>3. add an action of "replace with a text" (when the alternative resource of AA is a text) or "replace with a URL" (when the alternative resource of AA is a URL)<br>4. alternative resource of AA command -> alternative resource of the merged command |
| | low | 1. generate no merged command.<br>2. automatically delete the contents located at "destination node address" since there is no related information in the merged meta file |

Figure 3:
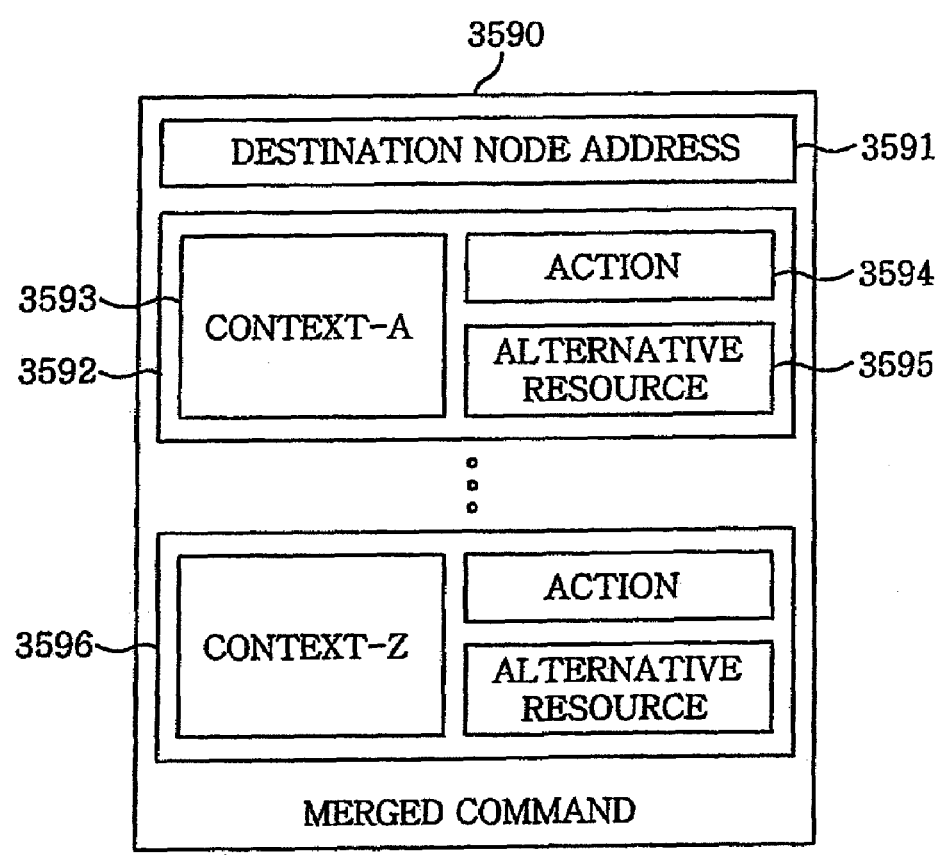
FIG. 3 describes an exemplary structure of a merged command in accordance with the present invention.

As a result of the aforementioned merging, the merged meta file 320 of FIG. 3 is generated.

Figure 4:
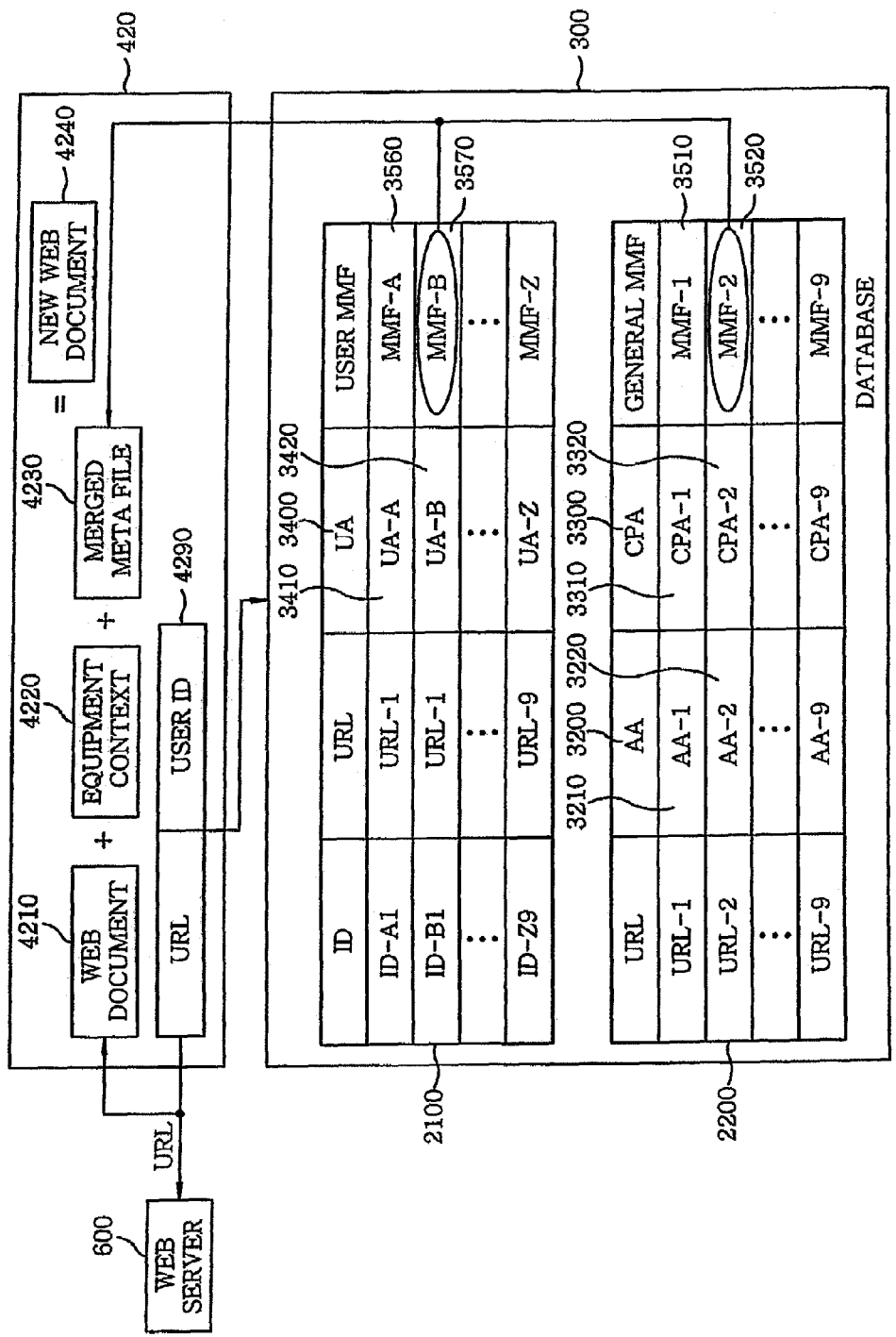
FIG. 4 provides a detailed block diagram of an annotation processing component of FIG. 1 in accordance with the present invention.

Now, reference is made to FIG. 4, which provides a detailed block diagram of an annotation processing component 420 of FIG. 1. If the merged meta file 320 is generated from AA 311 alone or CPA 312 alone, or by merging AA 311 with CPA 312, it is stored in a general annotation/meta file table 2200. Otherwise, the merged meta file 320 is stored in a user annotation/meta file table 2100.

Referring back to FIG. 1, the annotation server 200 provides the annotation file database 300 with the annotation data 310 from the annotation editor 100. The annotation file database 300 stores the annotation data 310 from the annotation server 200. The annotation data 310 comprises AA data 311, CPA data 312, and UA data 313, depending on their annotators. AA data 311 and CPA data 312 are stored and managed in the general annotation/meta file table 2200, and UA data 313 is stored and managed in the user annotation/meta file table 2000.

Each of the annotators can specify actions during his/her annotation, depending on his/her level. Specific actions which can be made by each of the annotators are listed in Table 3.

TABLE 3

| annotator | Action |
|---|---|
| author | give an importance level to contents, assign alternative contents to specific portions of contents |
| contents provider | make a general annotation to contents(preserve, replace, delete) |
| user | make user's specific annotation(preserve, replace, delete) |

Figure 5:
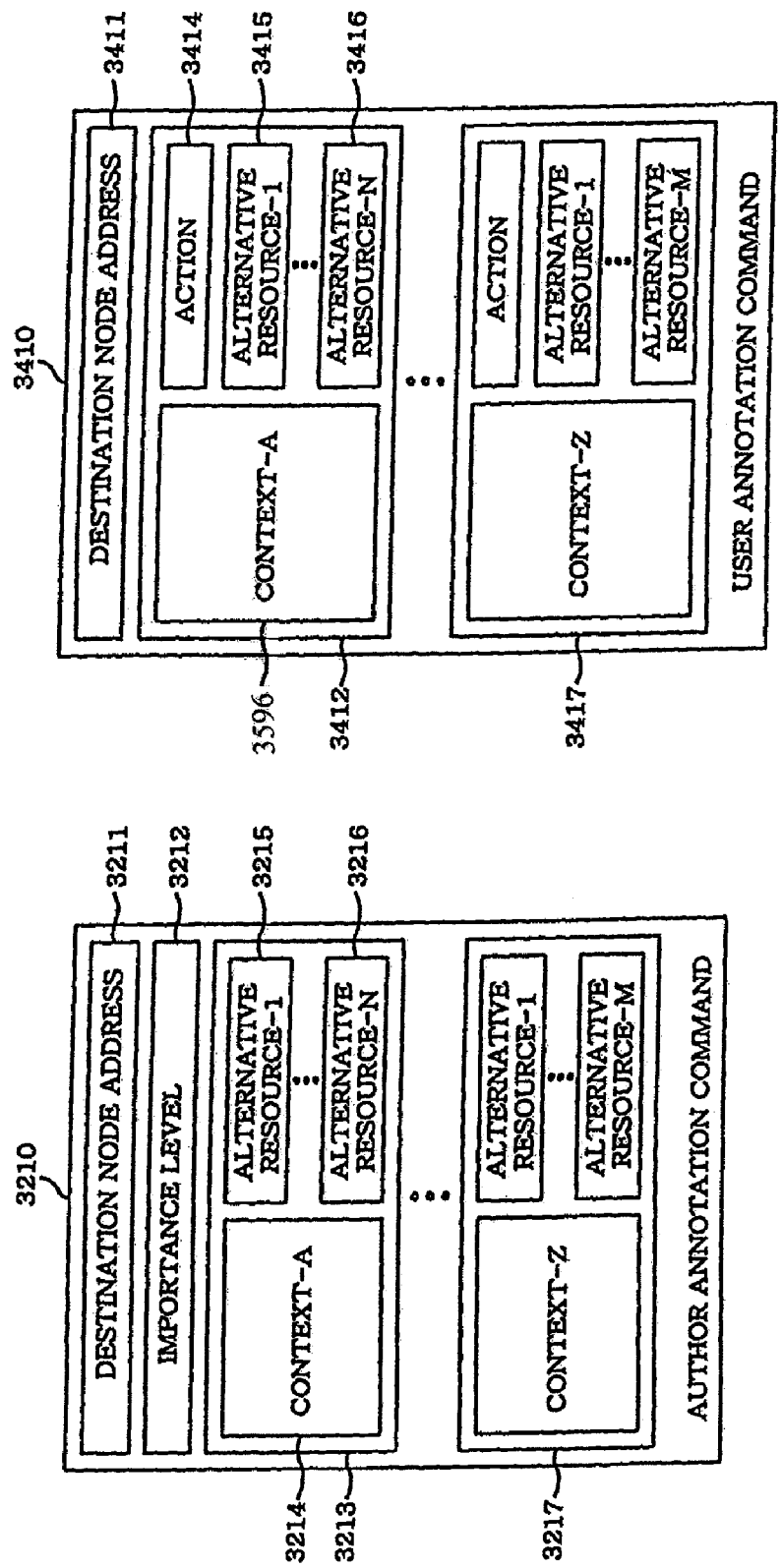
FIG. 5 illustrates an exemplary structure of an author annotation command and a user annotation command in accordance with the present invention.

More detailed description on the annotator's actions is provided below with reference to FIG. 5 depicting the structure of AA command 3210 and UA command 3410 in accordance with the present invention.

AA 3200 shown in FIG. 4 is comprised of a plurality of AA commands 3210 and 3220, and AA command 3210 comprises a destination node address 3211, an importance level 3212, and a plurality of commands 3213 and 3217 as shown in FIG. 5. The destination node address 3211 in AA command 3210 can be represented as "Xpath" or "Xpointer" indicating the location of a special element in the web contents. The importance level 3212 can be indicated as "high", "medium", or "low", wherein "high" means that the intact original contents should be displayed on any types of user terminals, "medium" means that the modified contents can be displayed on the user terminals, and "low" means that the contents may be deleted if necessary.

Each of the plurality of commands 3213 and 3217 comprises context information 3214 and a list of alternative resources 3215 and 3216. The context information 3214 shows the capabilities of a user terminal or displaying performance of a web browser. Exemplarily, the context of "The size of a display is 300 pixels×300 pixels or more, and the markup language HTML can be displayed at the web browser." can be described.

In accordance with a preferred embodiment of the present invention, an exemplary AA command 3210 is shown in Table 4.

TABLE 4

| destination node address | Html/body/img[1] |
|---|---|
| importance level | medium |
| context | equipment type of a user terminal : internet accessible phone |
| alternative resources | "This is a picture of the sea." |

The above exemplary AA command 3210 represents that the importance level of the first image of the current web document is "medium", and the text of "This is a picture of the sea." can be alternatively displayed at the user terminal in place of the first image if the equipment type of the user terminal is an internet accessible phone.

Meanwhile, CPA 3300 shown in FIG. 4 comprises a plurality of CPA commands 3310 and 3320 and UA 3400 shown in FIG. 4 comprises a plurality of UA commands 3410 and 3420. Since the structure of CPA command is same as that of UA command, only an exemplary UA command 3410 is shown in FIG. 5.

The UA command 3410 comprises a destination node address 3411 and a plurality of commands 3412 and 3417. The meaning of the destination node address 3411 is the same as that of AA command 3210. Each of the plurality of commands 3412 and 3417 comprises context information 3413, action 3414, and a list of alternative resources 3415 and 3416.

In accordance with a preferred embodiment of the present invention, an exemplary UA command 3410 is shown in Table 5.

TABLE 5

| destination node address | Html/body/img[1] |
|---|---|
| context | equipment type of a user terminal : internet accessible phone |
| action | replace with a text |
| alternative resources | "a picture of the sea" |

The above exemplary UA command 3410 represents that the text of "a picture of the sea" can be alternatively displayed at the user terminal in place of the first image if the equipment type of the user terminal is an internet accessible phone.

In the above UA command 3410, action 3414 is "preserve current contents", "replace with a text", or "replace with a URL". "preserve current contents" means that the intact original contents should be preserved, "replace with a text" means that the original contents should be replaced with a text specified in the alternative resources 3415 and 3416, and "replace with a URL" means that the original contents should be replace with a URL specified in the alternative resources 3415 and 3416. Although "delete" is not explicitly specified in the action 3414, the original contents are considered to be "deleted" when there is no specified action.

According to a preferred embodiment of the present invention, the alternative resources 3415 and 3416 may be same as that 3215 and 3216 of commands 3213 and 3217 in AA command 3210. That is to say, the user can select an alternative resource from the author's alternative resources 3215 and 3216. Alternatively, the user can select an alternative resource other than the author's.

Since the structure of CPA 312 is same as that of UA 313 and CPA 312 is a default UA for the web document, a user who does not log in the web service with his/her log in ID has the CPA 312 as his/her default UA.

In accordance with the present invention, there exists zero(0) or one(1) AA 312 and CPA 312 for one web document located at a URL. Further, for the web document, there exists zero(0) or one(1) UA 313 per user.

When each of the annotators finishes to annotate the web document, the annotations are stored in the standard annotation/meta file table 2200 or the user annotation/meta file table 2100 while the merged meta file 320 associated therewith is updated and stored. Update operation of the annotation/meta file tables 2100 and 2200 in the annotation file DB 300 is shown in Table 6.

TABLE 6

| order | Action | Result |
|---|---|---|
| 1 | an author annotates a web document located at URL-1 | 1. AA-1 is stored in the table 2200<br>2. MMF-1 is stored in the table 2200 |
| 2 | a contents provider annotates the web document located at URL-1 | 1. CPA-1 is stored in the table 2200<br>2. MMF-1 is modified and stored in the table 2200 |
| 3 | a first user (ID:A1) annotates the web document located at URL-1 | 1. UA-A is stored in the table 2100<br>2. MMF-A is stored in the table 2100 |
| 4 | a second user (ID:B1) annotates the web document located at URL-1. | 1. UA-B is stored in the table 2100<br>2. MMF-B is stored in the table 2100 |

Referring back to FIG. 4, the operation of generation and update of the annotation/meta file of Table 6 is described in detail.

1. When an author annotates a web document located at URL-1, AA-1 3210 is stored in the general annotation/ meta file table 2200, and then, the merged meta file (MMF-1) 3510 associated with AA-1 3210 is generated by the annotation merging module 112 and stored in the general annotation/meta file table 2200.
2. When a contents provider annotates the web document located at URL-1, CPA-1 3310 is stored in the general annotation/meta file table 2200, and then, the merged meta file(MMF-1) 3510 is updated by merging CPA-1 3310 with the existing AA-1 3210 in the annotation merging module 112 and stored in the general annotation/meta file table 2200.
3. When a first user(ID: A1) annotates the web document located at URL-1, UA-A 3410 is stored in the user annotation/meta file table 2100, and then, the merged meta file(MMF-A) 3560 is generated by merging UA-A 3410 with the existing AA-1 3210 and CPA-1 3310 in the annotation merging module 112 and stored in the user annotation/meta file table 2100.
4. When a second user(ID: B1) annotates the web document located at URL-1, UA-B 3420 is stored in the user annotation/meta file table 2100, and then, the merged meta file(MMF-B) 3570 is generated by merging UA-B 3510 with the existing AA-1 3210 and CPA-1 3310 in the annotation merging module 112 and stored in the user annotation/meta file table 2100.

Referring still to FIG. 4, the annotation processing system 400, which comprises a pre-processing component 410, the annotation processing component 420, and a post-processing component 430 shown in FIG. 1, can be disposed at the same location as that of the web server 600. Alternatively, the annotation processing system 400 can be implemented by a separate system in the form of proxy.

If a user requests a web document located at a URL to be displayed on the browser of his/her terminal, which is one of the 1st to n-th user terminals 500-1 to 500-n of FIG. 1, the request information 4290 is provided to the web server 600 by the annotation processing system 400. Then, the web document 4210 corresponding to the request information 4290 is supplied to the annotation processing system 400 from the web server 600.

The pre-processing component 410 performs preprocessing necessary for processing the web document 4210 from the web server 600. In accordance with a preferred embodiment of the present invention, the pre-processing component 410 extracts information 4290 including a URL and a user ID and the equipment context information 4220 from the request information to transmit the extracted information to the annotation processing component 420.

The annotation processing component 420 retrieves the merged meta file 320 from the annotation file DB 300 based on URL and the user ID included in the information 4290 from the pre-processing component 410. In case that the user ID does not exist(a user who does not log in), the annotation processing component 420 retrieves corresponding one of the merged meta files 3510 and 3520 from the general annotation/meta file table 2200. In case that the user ID does exist(a user who does log in), the annotation processing component 420 retrieves corresponding one of the merged meta files 3560 and 3570 from the user annotation/meta file table 2100.

Further, the annotation processing component 420 combines the web document 4210 with the equipment context information 4220 extracted from the request information by the pre-processing component 410 and the merged meta file 4230 from the annotation file DB 300 to generate new web document 4240 adapted for the context of the web browser on corresponding one of the user terminals 500-1 to 50-n requesting the web document.

Figure 6:
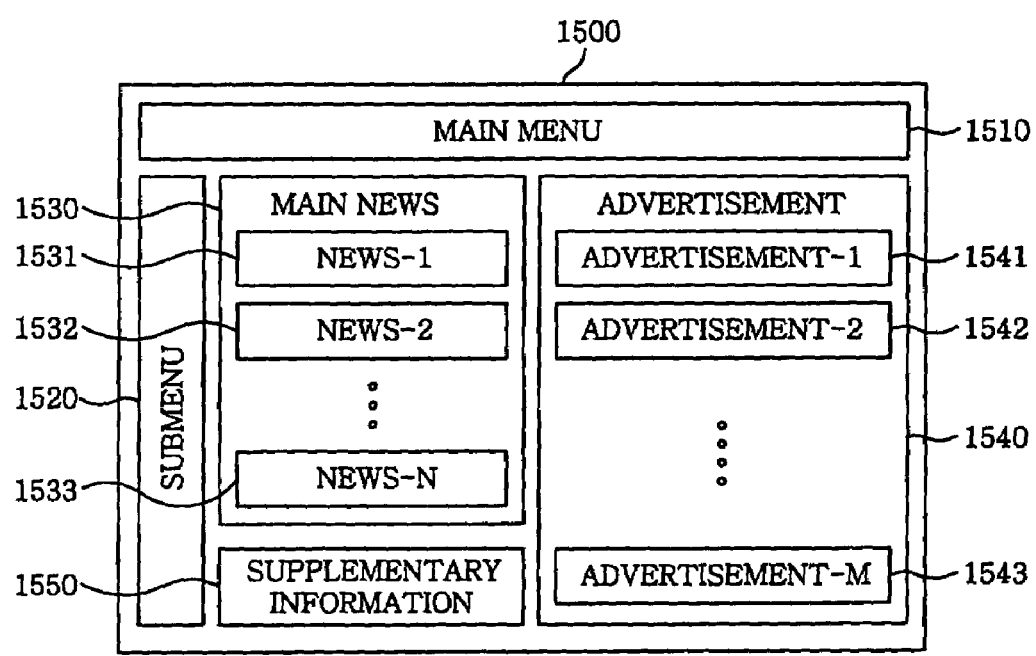
FIG. 6 shows an exemplary view of a news site.

The post-processing component 430 performs necessary operations, such as tag conversion, document fragmentation, and etc, to thereby transmit the processed web document to the web browser on corresponding one of the user terminals Now referring to FIG. 6, a view of a web document, for example, a view of a news site 1500 is provided in accordance with a preferred embodiment of the present invention. The news site 1500 comprises a less frequently updated portion including a main menu 1510, a sub menu 1520, main news 1530, advertisements 1540 and a footer 1550, and a frequently updated portion including a news-1 1531, news-2 1532, news-N 1533, advertisements-1 1541, advertisements-2 1542 and advertisement-M 1543, wherein the footer 1550 indicates a bottom portion of a web site representing an address and a phone number of the contents provider, copyright information, and so forth.

Assume a case that one day an annotator puts an annotation on the web document in order for news-N to be displayed at a user's PDA, and, the next day, if there exist only N−1 news at the web site, an error occurs. Thus, it is necessary to introduce a concept of synchronization.

Figure 7:
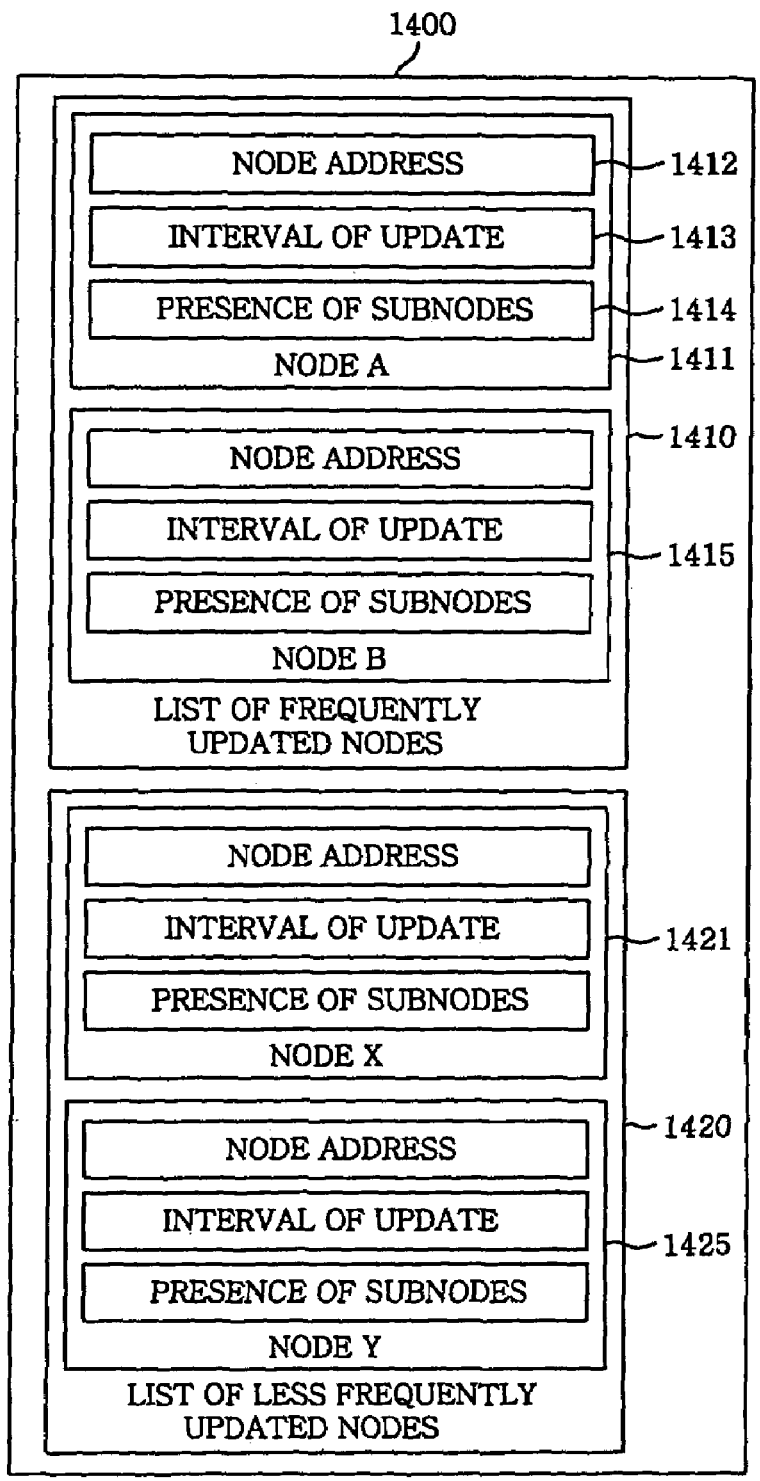
FIG. 7 offers an exemplary structure of synchronization information in accordance with the present invention.

FIG. 7 offers an exemplary structure of synchronization information 1400 in accordance with the present invention. The synchronization information 1400 is comprised of a list of frequently updated nodes 1410 and a list of less frequently updated nodes 1420, each of the lists including node information 1411, 1415, 1421, and 1425. The node information 1411 comprises a node address 1412, an interval of update 1413, and presence of sub nodes 1414, wherein the presence of sub nodes 1414 represents whether the corresponding node comprises sub nodes or not.

The synchronization information 1400 can be made at the user interface 130 in the annotation editor 100 shown in FIG. 1 by an author prior to preparation of AA, CPA, and UA. The author classifies each portion of the web document into the frequently updated nodes and the less frequently updated nodes by using an appropriate tool provided by the user interface 130 of the annotation editor 100.

Thereafter, when an annotator puts an annotation on a web document, the user interface 130 of the annotation editor 100 makes the synchronization information displayed at the display unit to help the annotator to deciding whether he/she puts an annotation on the web document or not. More specifically, the annotator can make an annotation to only the portions of less frequently updated nodes of the web document.

As described above, the present invention renders each of the annotators to make his/her own annotation to the web document based on the context information relating to the display capability of the web browser of the user terminal, and generates a new web document adapted for the user terminal by combining the context information with the merged meta file generated from the annotations, to efficiently provide a plurality types of user terminals of various characteristics with existing web documents adapted for each of the user terminals.

Though the invention has been shown and described with reference to the preferred embodiments, it would be understood by those skilled in the art that various changes and modifications may be made without departing from the spirit and scope of the invention defined in the following claims.

What is claimed is:

1. An annotation based automatic web document generation apparatus comprising:
    a web server for providing a web document;
    an annotation editor for referring the web document from the web server to generate at least one annotation and for generating a merged command for data for said at least one annotation; and
    an annotation/meta file database for storing the data for said at least one annotation and a merged meta file including the merged command for the data for said at least one annotation;

wherein the annotation includes:
    a destination address of a destination node;
    an importance level of the destination node;
    a context indicating characteristics of a user terminal accessing the destination node;
    alternative resources for the destination node; and
    an action for the contents of the destination address if the annotation is one of the contents provider annotation and the user annotation, the action being one of "preserve current contents", "replace with a text", and "replace with a URL", the action indicating whether the contents of the destination address are be replaced with information specified in the alternative resources; and wherein the merged meta file is generated as follows:
    i) in case that there exists the author annotation alone as said at least one annotation,
        a) a "preserve contents" command is generated in the merged meta file if the importance level of the author annotation is "high";
        b) a "replace contents" command is generated in the merged meta file if the importance level of the author annotation is "medium"; and
        c) no command is generated in the merged meta file if the importance level of the author annotation is "low";
    ii) in case that there exists one of the contents provider annotation and the user annotation as said at least one annotation, said at least one annotation is regenerated as the merged meta file;
    iii) in case that there exist the author annotation and the contents provider annotation as said at least one annotation,
        a) the "preserve contents" command is generated in the merged meta file if the importance level of the author annotation is "high"; and
        b) the contents provider annotation is regenerated as the merged meta file otherwise;
    iv) in case that there exist the author annotation and the user annotation as said at least one annotation,
        a) the "preserve contents" command is generated in the merged meta file if the importance level of the author annotation is "high"; and
        b) the user annotation is regenerated as the merged meta file otherwise;
    v) in case that there exist the author annotation, the contents provider annotation, and the user annotation as said at least one annotation,
        a) the "preserve contents" command is generated in the merged meta file if the importance level of the author annotation is "high"; and
        b) the user annotation is regenerated as the merged meta file otherwise; and
    vi) in case that there exist the contents provider annotation and the user annotation as said at least one annotation, the user annotation is regenerated as the merged meta file.

2. The apparatus of claim 1, wherein the annotation editor including:
    a user interface for inputting a URL of a web document requested by a user, displaying the web document transmitted from the web server, and generating said at least one annotation for the web document by referring the web document;
    a request processor for providing a request for the web document to the web server and receiving the web document from the web server to supply the received web document to the user interface; and an annotation processor for generating the merged command and providing the merged command to the annotation/meta file database.

3. The apparatus of claim 2, wherein the user interface refer the web document by using a "what you see is what you get" (WYSIWYG) scheme.

4. The apparatus of claim 1, wherein the annotation is one of an author annotation, a contents provider annotation, and a user annotation, the author annotation being made by an author of the web document, the contents provider annotation being made by a provider of the web document, and the user annotation being made by one of users of the web document.

5. The apparatus of claim 1, further comprising an annotation processing system for providing a URL where a web document requested by a user to the web server, and, in response to a request for the web document, for generating a new web document by using the merged meta file stored in the annotation/meta file database.

6. The apparatus of claim 5, wherein the annotation processing system including:
  a pre-processing component for extracting user context information having the URL, a user ID, and characteristics of a user terminal from the request;
  an annotation processing component for retrieving the merged meta file corresponding to the web document from the annotation/meta file database based on the URL and the user ID to generate a new web document adapted for the user terminal; and
  a post-processing component for performing tag conversion and document fragmentation for the new web document and for transmitting the result web document to the user terminal.

7. An annotation based automatic web document generation method for used in an annotation based automatic web document generation apparatus comprising a web server for providing the web document and an annotation/meta file database for storing the annotations corresponding to the web document, the method comprising the steps of:
  referring the web document from the web server to generate at least one annotation for the web document and generating a merged command for data for said at least on annotation; and
  storing the data for said at least on annotation and a merged meta file including the merged command for the data;
  wherein the annotation includes an address of a destination node, an importance level of the destination node, a context indicating characteristics of a user terminal accessing the destination node, and alternative resources for the destination node; and
  wherein the merged meta file is generated as follows:
  i) in case that there exists the author annotation alone as said at least one annotation,
    a) a "preserve contents" command is generated in the merged meta file if the importance level of the author annotation is "high";
    b) a "replace contents" command is generated in the merged meta file if the importance level of the author annotation is "medium"; and
    c) no command is generated in the merged meta file if the importance level of the author annotation is "low";
  ii) in case that there exists one of the contents provider annotation and the user annotation as said at least one annotation, said at least one annotation is regenerated as the merged meta file;
  iii) in case that there exist the author annotation and the contents provider annotation as said at least one annotation,
    a) the "preserve contents" command is generated in the merged meta file if the importance level of the author annotation is "high"; and
    b) the contents provider annotation is regenerated as the merged meta file otherwise;
  iv) in case that there exist the author annotation and the user annotation as said at least one annotation,
    a) the "preserve contents" command is generated in the merged meta file if the importance level of the author annotation is "high"; and
    b) the user annotation is regenerated as the merged meta file otherwise;
  v) in case that there exist the author annotation, the contents provider annotation, and the user annotation as said at least one annotation,
    a) the "preserve contents" command is generated in the merged meta file if the importance level of the author annotation is "high"; and
    b) the user annotation is regenerated as the merged meta file otherwise; and
  vi) in case that there exist the contents provider annotation and the user annotation as said at least one annotation, the user annotation is regenerated as the merged meta file.

8. The method of claim 7, wherein the annotation is one of an author annotation, a contents provider annotation, and a user annotation, the author annotation being made by an author of the web document, the contents provider annotation being made by a provider of the web document, and the user annotation being made by one of users of the web document.

9. The method of claim 7, wherein the importance level is one of "high", "medium", and "low", and is operable to determine whether content of the destination node is displayed at the user terminal.

10. The method of claim 7, wherein the annotation further includes an action for the contents of the destination address if the annotation is one of the contents provider annotation and the user annotation, the action being one of "preserve current contents", "replace with a text", and "replace with a URL", indicating whether the contents of the destination address are preserved intact or replaced by data in the alternative resources.

11. An annotation based automatic web document generation method for used in an annotation based automatic web document generation apparatus comprising a web server for providing the web document and an annotation/meta file database for storing the annotations corresponding to the web document, the method comprising the steps of:
  referring the web document from the web server to generate at least one annotation for the web document and generating a merged command for data for said at least on annotation; and
  storing the data for said at least on annotation and a merged meta file including the merged command for the data;
  wherein the merged meta file is generated as follows:
  i) in case that there exists the author annotation alone as said at least one annotation,
    a) a "preserve contents" command is generated in the merged meta file if the importance level of the author annotation is "high";

b) a "replace contents" command is generated in the merged meta file if the importance level of the author annotation is "medium"; and
c) no command is generated in the merged meta file if the importance level of the author annotation is "low";
ii) in case that there exists one of the contents provider annotation and the user annotation as said at least one annotation, said at least one annotation is regenerated as the merged meta file;
iii) in case that there exist the author annotation and the contents provider annotation as said at least one annotation,
a) a the "preserve contents" command is generated in the merged meta file if the importance level of the author annotation is "high"; and
b) the contents provider annotation is regenerated as the merged meta file otherwise;
iv) in case that there exist the author annotation and the user annotation as said at least one annotation,
a) the "preserve contents" command is generated in the merged meta file if the importance level of the author annotation is "high"; and
b) the user annotation is regenerated as the merged meta file otherwise;
v) in case that there exist the author annotation, the contents provider annotation, and the user annotation as said at least one annotation,
a) the "preserve contents" command is generated in the merged meta file if the importance level of the author annotation is "high"; and
b) the user annotation is regenerated as the merged meta file otherwise; and
vi) in case that there exist the contents provider annotation and the user annotation as said at least one annotation, the user annotation is regenerated as the merged meta file.

* * * * *